(12) United States Patent
Marshall

(10) Patent No.: US 10,690,859 B1
(45) Date of Patent: Jun. 23, 2020

(54) TWISTED Z OPTICAL SWITCH

(71) Applicant: Sam A Marshall, Georgetown, TX (US)

(72) Inventor: Sam A Marshall, Georgetown, TX (US)

( * ) Notice: Subject to any disclaimer, the term of this patent is extended or adjusted under 35 U.S.C. 154(b) by 73 days.

(21) Appl. No.: 16/041,805

(22) Filed: Jul. 22, 2018

(51) Int. Cl.
*G02B 6/35* (2006.01)
*G02B 6/32* (2006.01)

(52) U.S. Cl.
CPC ............ *G02B 6/3544* (2013.01); *G02B 6/32* (2013.01); *G02B 6/3518* (2013.01)

(58) Field of Classification Search
CPC ...... G02B 6/32; G02B 6/3516; G02B 6/3518; G02B 6/3544
USPC ...................................... 385/17, 18
See application file for complete search history.

(56) References Cited

U.S. PATENT DOCUMENTS

| | | | |
|---|---|---|---|
| 6,330,102 B1 * | 12/2001 | Daneman | B81B 3/0021 359/290 |
| 6,466,356 B1 * | 10/2002 | Peeters | G02B 6/3518 257/415 |
| 6,549,692 B1 * | 4/2003 | Harel | G02B 6/359 359/290 |
| 6,560,384 B1 * | 5/2003 | Helkey | G02B 6/3564 385/16 |
| 6,567,574 B1 * | 5/2003 | Ma | H04Q 11/0005 385/16 |
| 6,632,374 B1 * | 10/2003 | Rosa | B81C 1/00666 216/2 |
| 6,671,428 B1 * | 12/2003 | Yang | G02B 6/29311 385/18 |
| 6,690,849 B1 * | 2/2004 | Dadap, Jr. | G02B 6/3556 385/17 |
| 6,771,426 B2 * | 8/2004 | Yamamoto | G02B 6/3524 359/619 |
| 6,922,500 B2 * | 7/2005 | Huang | H04Q 11/0005 385/18 |
| 8,817,359 B2 * | 8/2014 | Chau | H04Q 11/0005 359/290 |
| 9,733,432 B2 * | 8/2017 | Jiang | H04Q 11/0005 |
| 2002/0146197 A1 * | 10/2002 | Yong | G02B 6/3566 385/17 |
| 2002/0181846 A1 * | 12/2002 | Hoen | G02B 6/3556 385/18 |
| 2003/0002783 A1 * | 1/2003 | Neilson | G02B 6/32 385/18 |

* cited by examiner

*Primary Examiner* — Robert Tavlykaev

(57) ABSTRACT

A 3D free space mirrored optical cross connect switch has mirror arrays angled at twice the central incident angle. Path length variation and insertion loss variation are minimized between different switch ports. For each port, the incident angle may be selected to maximize the useful range of the mirror actuator.

4 Claims, 3 Drawing Sheets

TWISTED Z OPTICAL SWITCH

BACKGROUND

Optical cross connect switches (OXC) are well known to optically switch signals between an array of input fibers to an array of output fibers. Of consideration are OXC's employing 3D free space beams and 2D MEMS mirror arrays. OXCs are also known as an Optical Cross connect Switch OCS, and with the addition of splitters and combiners as a Reconfigurable Add Drop Multiplexer (ROADM).

FIG. 1 is a section of a ray trace of a Prior Art Z bend OXC 100. An input block 110 has a fiber block 111 to arrange input fibers into a 2D array, and a 2D array of collimating lenses 112 couples the input beams from fiber into free space. The pitch is constant, and fiber is centered on the lens. This results in an 2D array of parallel beams 171a-c, 1 per fiber, in free space. Only 2 marginal ports are shown for illustrative purposes. Arrays of 320 fibers are common.

An output block 140 is the same as the input block 110, but with the beams 173a-c travelling in the opposite direction. A 2D array of focusing lenses 142 couples the output beams from 3D free space into a 2D array of fibers 141.

A pair of 2D steering mirror arrays 120 and 130 are arrays of independent flat mirror elements, located between input fiber block 110 and output fiber block 140. Mirror arrays 120 and 130 are parallel to each other. The incidence angle 161 between input block 110 and mirror array 120 is the same as the incidence angle between mirror array 130 and output block 140. Each fiber in the input block 110 to corresponds to a mirror in the input mirror array 120, and each mirror in the output mirror array 130 corresponds to a fiber in the output block 140. The mirrors are arranged in a Z bend configuration, as to steer each beam from an input mirror to an output mirror. For example, beam 171a may be steered to 172a and 173a, or 172c and 173c. By independently adjusting the azimuth and elevation actuation angles 162a-c of each mirror element, the beams are precisely positioned. The angle of the output mirror element is the complement of the angle of the corresponding input mirror. Actuation angle 162a is in the opposite sign of actuation angle 162c, thus the mirror actuator must be capable of twice the angle 162a.

A controller 150 determines and optimizes the position of each mirror element.

The free space beams are Gaussian. The beam profile suffers from divergence with distance. The point along the beam profile with the smallest beam diameter is the waist.

For the illustrated example, with a 30 degree incidence angle 161 and a +/−20 degree maximum mirror actuation angle 162, the difference in path length 171a to 172a to 173a versus 171a to 172c to 173c is 37.5%. The variation in optical path length results in the waist not being located at the focusing mirror for all mirror angles. Variation in beam size results in a variation of insertion loss, dependent on which switch ports are selected. Optical link budgets are based on worst case insertion loss. This port to port variation in insertion loss can lead to higher insertion loss ports becoming unusable, such as in U.S. Pat. No. 9,210,487 "Implementation Of A Large-Scale Multi-Stage Non-Blocking Optical Switch".

Also, OXCs are 10 limited, the number of ports is limited by electrical 10 count. Each mirror element actuator requires 4 analog control leads plus spares and grounds. A 320 port switch mirror array package may have over 1900 pins.

SUMMARY

Steering mirror arrays are placed at an angle of twice the incidence angle of the central port. For the central port, the second reflection has the opposite sign of a standard Z bend. This twisted Z bend configuration gives lower port to port path length variation and lower port to port insertion loss variation.

Optionally, a different incidence angle may be selected for each port, offset from the incidence angle of the central port, such that the full actuation angle for each port sweeps the mirror array. The fiber may be offset from the lens center a different distance for each port. A constant pitch fiber lens array with a gradient pitch fiber array a non-parallel port ray fan.

DETAILED DESCRIPTION

Figure 2:
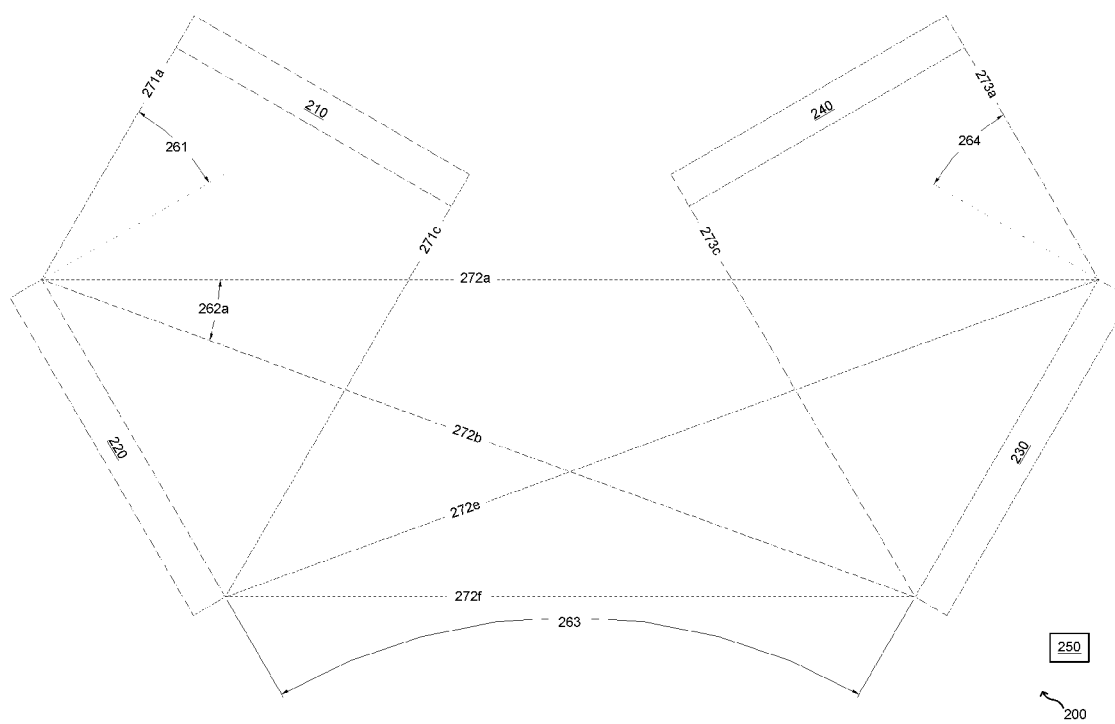
FIG. 2 is a section of a ray trace of a twisted Z bend OXC.

FIG. 2 is a section of a ray trace of a twisted Z bend OXC. A twisted Z bend OXC 200 may use identical components as well-known Z bend OXC 100. Mirror arrays 220 and 230 are not parallel, as with Z bend OXC 100, but are oriented at mirror array angle 262. Mirror array angle 262 is preferably twice the incidence angle 261. For a central port, the second reflection has the opposite sign of a standard Z bend.

Figure 1:
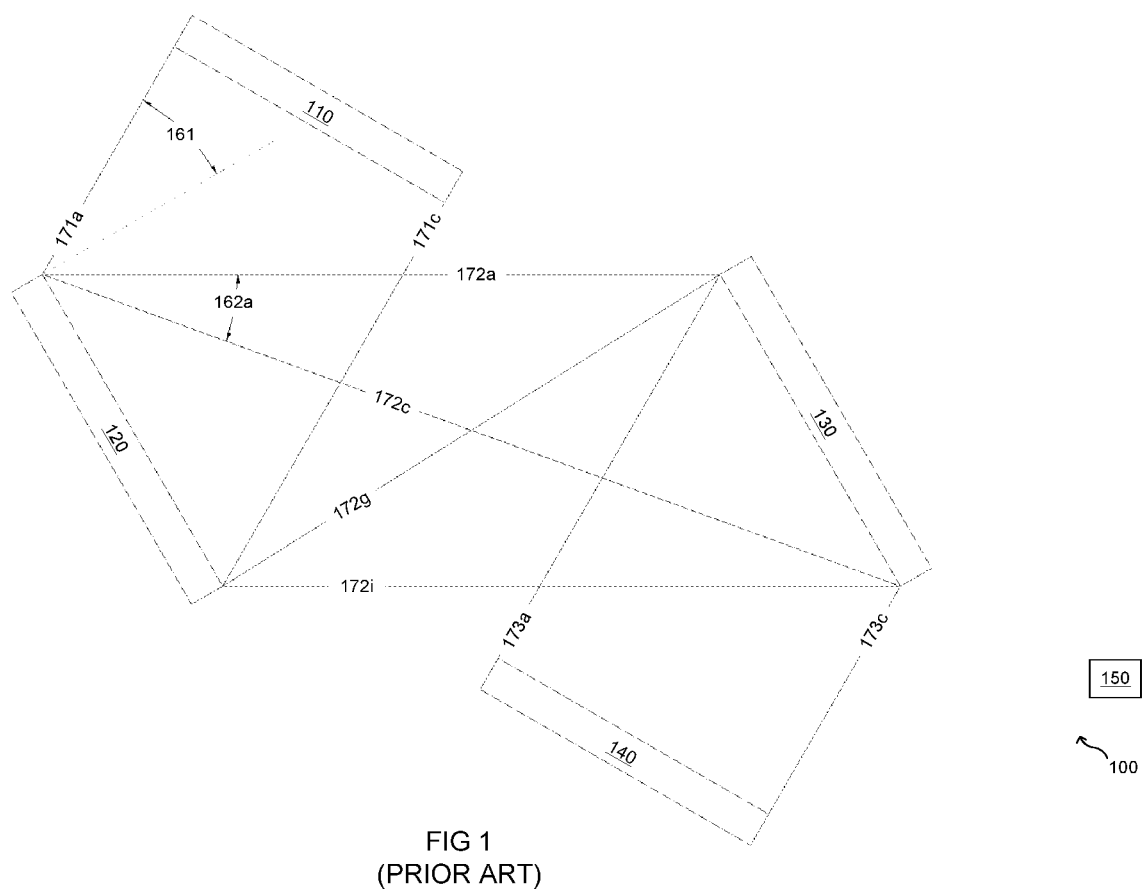
FIG. 1 is a section of a ray trace of a Prior Art Z bend OXC.

For the same incidence and mirror actuation angles as illustrated in the FIG. 1, the path length variation from any input port to the output port with the shortest path length (ray 271a, 272a, 273a) versus the port with the longest path length (ray 271a, 272b, 273b) may be 7.6%. This has the advantage of lower insertion loss variation dependent on which switch port is selected. The maximum insertion loss of the switch may be improved, for the same mirror arrays.

In some embodiments, lower insertion loss can be traded for a longer optical bench with the same insertion loss, but more ports.

Figure 3:
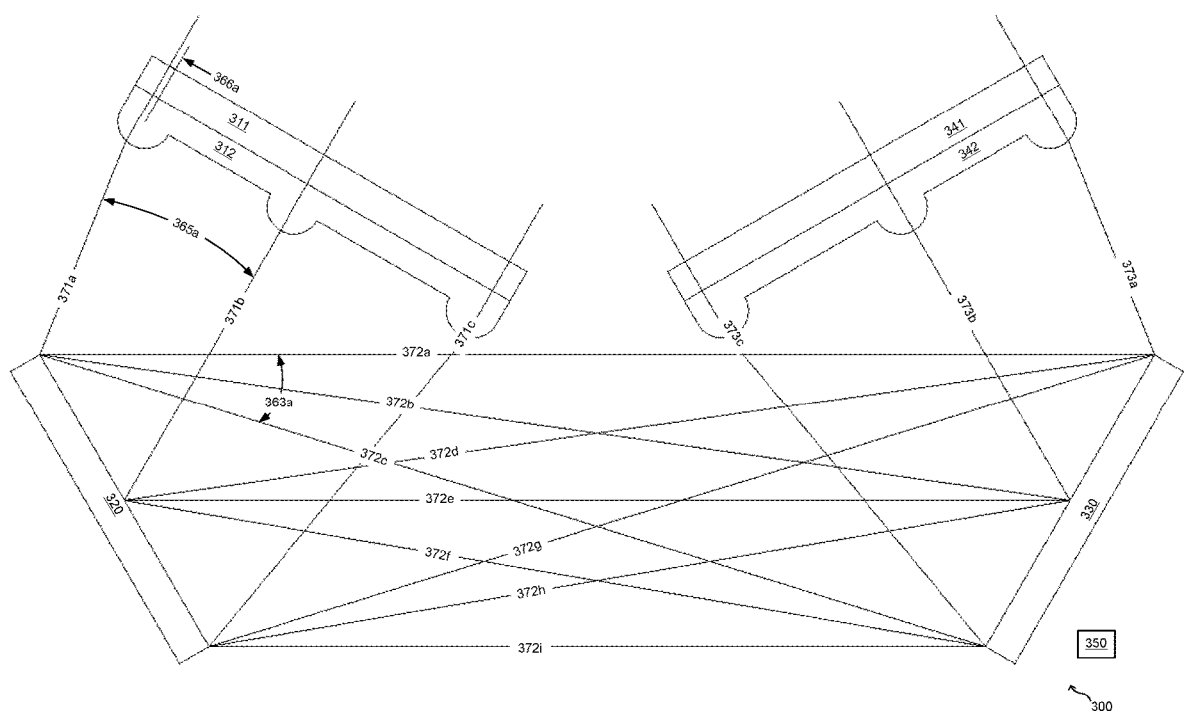
FIG. 3 is a section of a ray trace of an offset twisted Z bend OXC.

FIG. 3 is a section of a ray trace of an offset twisted Z bend OXC 300. The port to port pitch of input fiber block 311 differs by an optical axis offset 366a from the port to port pitch of input lens array 312. Output fiber block 341 and output lens array 342 are the same as input lens array 312 and input fiber block 311. Like fiber block 211, beams are normal to the block face.

Each optical axis offset 366a-c has a x and y component, and angle offset 365a-c has a θ and ψ component. Each array element a-c may have a unique offset value, determined by the desired unique offset angle 365a, c. The pitch of fiber block 311 may not be uniform. The resultant ray fan may be divergent. Alternatively, aspheric lenses may produce an offset angle. Or, the lens may be plano-convex, with the plano surface angled as to produce the desired offset angle. Or, angle offset 365a-c bay be produced by other means.

Angle offset 365a-c may be half of mirror reflection angle range 363a-c. This port dependent offset centers the incident beam 371a-c with respect to the mirror actuation angle 362. Thus, if all mirror actuation angles 362a-c are 0 degrees, beams 371a-c, are reflected as beams 372b, e, and h, and are all incident on the opposing central mirror. This has the advantage that the full range of mirror actuation angles 362a-c are fully utilized for each port. Conversely, without offsetting the incident beams, as with OXC 200, if mirror actuation angles 263a-c are 0 degrees, beams 271a-c, are reflected as beams 272a, e, and i, and are all incident on the respective output mirror, and only half of the mirror actuation angle may be used. Full utilization of mirror actuation angle allows the mirror actuators to be simplified, the mirror actuation angle doubled, optical path length reduced, insertion loss reduced, or any mix in between.

Actuator driver electronics within controller 250 may be integrated into an ASIC. Mirror array 220 or 230 may be placed on top of the ASIC and connected with balls, columns, or wire bonds.

Preferred ratios and relationhips of angles and offsets have been disclosed. Other ratios and relationships are readily possible without departing from the spirit of the invention.

The invention claimed is:

1. A fiber optical cross connect switch including:
   a 2D array of input fibers, each input fiber optically coupled to a corresponding collimating lens in a 2D array of collimating lenses, each collimating lens optically coupled to a corresponding mirror in a 2D array of first steering mirrors;
   a 2D array of second steering mirrors, each second steering mirror optically coupled to a corresponding focusing lens in a 2D array of focusing lenses, each focusing lens optically coupled to a corresponding output fiber in a 2D array of output fibers;
   wherein:
   an array of principal rays exiting from the 2D array of collimating lenses forms a diverging array of input principal rays; and
   an array of principal rays incident on the 2D array of focusing lenses forms a converging array of output principal rays;
   an angle of the diverging array of input principal rays and an angle of the converging array of output principal rays are selected so as to reduce a mirror element actuation angle range of the corresponding 2D arrays of steering mirrors that is required to cross-connect any input fiber to any output fiber;
   the fiber optical cross connect switch is in a twisted Z configuration in which the 2D array of input arrays are oriented at an incidence angle to the 2D array of first steering mirrors, the 2D array of output arrays are oriented at the incidence angle to the 2D array of second steering mirrors; and the first and second mirror arrays are oriented at a mirror angle to each other; and
   the incidence and mirror angles are selected to result in less variation in an optical path length between any input fiber and any output fiber compared to a configuration having the first and second mirror arrays parallel to each other.

2. The fiber optical cross connect switch of claim 1, where the angle of the diverging array of input principal rays and the angle of the converging array of output principal rays are selected so as to place each principal ray on a central mirror element of the opposing mirror array, when a mirror element actuation angle of each mirror element is set to zero degrees.

3. The fiber optical cross connect switch of claim 1, where an optical axis of each input/output fiber and an optical axis of each respective collimating/focusing lens are offset so as to result in the diverging/converging arrays of input/output principal rays.

4. The fiber optical cross connect switch of claim 3, wherein each optical axis offset is selected so as to place each respective beam on a central mirror element of the opposing said mirror array, when a mirror element actuation angle of each mirror element is set to zero degrees.

* * * * *